United States Patent [19]

Inoue

[11] E Re. 30,870

[45] Reissued Feb. 23, 1982

[54] ELECTROMAGNETIC FLUIDICS SYSTEM AND METHOD

[76] Inventor: Kiyoshi Inoue, 3-16-8 Kamiyoga, Setagaya-ku, Tokyo, Japan

[21] Appl. No.: 191,553

[22] Filed: Oct. 21, 1971

Related U.S. Patent Documents

Reissue of:

[64] Patent No.: 3,494,369
Issued: Feb. 10, 1970
Appl. No.: 608,476
Filed: Dec. 19, 1966

[30] Foreign Application Priority Data

Dec. 21, 1965 [JP] Japan ..... 40/79186
Dec. 27, 1965 [JP] Japan ..... 40/80677
Dec. 27, 1965 [JP] Japan ..... 40/80678

[51] Int. Cl.[3] ..... F17D 1/16; F15C 1/08; F15C 1/14

[52] U.S. Cl. ..... 137/13; 137/807; 137/819; 137/827; 137/828; 137/831; 137/834

[58] Field of Search ..... 137/807, 827, 828, 831, 137/834, 13, 819

[56] References Cited

U.S. PATENT DOCUMENTS

| | | | |
|---|---|---|---|
| 2,763,125 | 9/1956 | Kadosch et al. | 137/827 X |
| 3,071,154 | 1/1963 | Cargill et al. | 137/827 X |
| 3,072,147 | 1/1963 | Allen et al. | 137/831 |
| 3,122,165 | 2/1964 | Horton | 137/834 X |
| 3,142,796 | 7/1964 | Goldberg et al. | 73/88.5 R X |
| 3,144,037 | 8/1964 | Cargill et al. | 137/828 |
| 3,258,685 | 6/1966 | Horton | 137/827 X |
| 3,263,695 | 8/1966 | Saudder et al. | 137/827 |
| 3,266,514 | 8/1966 | Brooks | 137/827 |
| 3,273,594 | 9/1966 | Mayer | 137/625.66 |
| 3,327,223 | 6/1967 | Halista | 137/827 X |
| 3,361,149 | 1/1968 | Meyer | 137/828 X |
| 3,390,692 | 7/1968 | Hastie et al. | 137/828 |
| 3,390,693 | 7/1968 | Ziemer et al. | 137/827 X |
| 3,395,720 | 8/1968 | Brooks | 137/827 X |
| 3,413,993 | 12/1968 | Ziemer | 137/827 X |
| 3,428,066 | 2/1969 | Herr | 137/827 |
| 3,438,384 | 4/1969 | Hurvitz | 137/807 X |

OTHER PUBLICATIONS

Invitation to Experiments, Freedman, Ira A., Ph.D., E. P. Dutton & Co., Inc., 1940, pp. 138–147.

*Primary Examiner*—William R. Cline
*Attorney, Agent, or Firm*—Karl F. Ross

[57] ABSTRACT

A fluidic system (e.g. amplifier or bistable unit) having an inlet branch and a pair of outlet branches separated by a fluid-flow splitter whereby the fluid is rendered electromagnetically susceptible, e.g. magnetic by incorporating magnetic particles therein, electrostatically responsive by being relatively dielectric, or electrically conductive, so that the fluid flow to the outlet branches may be controlled by magnetic, electrostatic or current flow means or an output may be derived by similar electromagnetic means for controlling an ancillary device, providing an indication of a fluid flow parameter or feedback control of an input parameter.

14 Claims, 9 Drawing Figures

ELECTROMAGNETIC FLUIDICS SYSTEM AND METHOD

Matter enclosed in heavy brackets [ ] appears in the original patent but forms no part of this reissue specification; matter printed in italics indicates the additions made by reissue.

My present invention relates to improvements in fluidics systems of the type making use of a Coanda effect and, more particularly, to electrically controlled or controlling fluidics apparatus and techniques whereby electromagnetic signals can modify the fluidics phase or the electromagnetic phase of the system by the fluid flow parameters.

Fluid-control devices and techniques involving the theory of fluidics have become more significant in later years inasmuch as fluidics systems have been found to be less affected by electrical transients, thermal instability and like phenomena which have long plagued electronic circuitry. Thus, while the Coanda effect has been known for some time, efforts to apply fluidics in place of electronic circuit elements have only lately come of age.

The basic element of a fluidics circuit can be considered the fluidics Y which comprises a trunk, inlet or main jet into which a flowing fluid, e.g. a liquid, is fed and a pair of branches, arms or outlet ducts from which the liquid emerges. A flow-path "splitter" or knife edge is provided at the junction of the outlet branches. One of these arms, in the absence of an enlarged chamber at the junction, can be considered the "normal" outlet arm in the sense that the Coanda effect directs substantially all of the liquid along this branch in the absence of a switching action. In a bistable fluidics switching device, comparable to bistable multivibrators or flip-flops of electronic circuitry, an input pulse can be used to switch the effective outlet branch. Thus, a control jet opening transversely to the base arm or inlet of the Y, close to the junction, will cancel temporarily the Coanda effect and deflect all or most of the liquid stream from the normal outlet branch to the other outlet branch or arm in which it continues to flow, even after termination of the control jet by virtue of the Coanda phenomenon. This phenomenon, variously referred to as the "wall effect," the "turbulence effect" or the "momentum-exchange principle," is basically a tendency of the fluid to hug one wall of the Y, usually the wall it is initially deflected toward, as it passes through the junction. Only when an interference is introduced does the fluid stream shift.

Thus, a pair of control jets of the same fluid but of low volume, velocity, pressure or power can be used to control a high velocity, high pressure and large volume fluid flow. In the bistable system just described, the Coanda phenomenon acts as a stabilizer of the plural states of the dynamic hydraulic circuit element.

Fluidic systems may also make use of a proportioning Y in fluid amplifying systems, which constitute the other basic type of hydrodynamic element of fluidics circuitry. In a proportioning element, the junction of the outlet arms with the base arm or inlet branch is enlarged or formed with a cavity nullifying the Coanda or wall-hugging effect. The control jets, however, open into this cavity and serves as the control elements of an amplifying device, akin to the base of a transistor, the gate of a controlled rectifier or the grid of an electron tube. As the intensity of the stream emerging from the lefthand control jet, for example, increases, the greater proportion of the liquid wil emerge from the righthand branch or outlet arm of the Y. When the control jet is terminated, the liquid stream splits uniformly between the branches at the knife edge. When the righthand jet is activated, the liquid flow in the righthand branch falls off in proportion to the velocity and pressure of the control jet, whereas the lefthand outlet branch sustains an increased flow rate; one or both jets can apply any desired bias to the system.

In general terms, devices of this character have come to be employed in cybernetic systems requiring strategically energized jets of air, in analog and digital circuitry, for logic systems and process controls under rigorous environmental conditions in which, for example, intense vibrations and shock or intense temperatures may damage highspeed electronic devices, in switching and amplifying systems of servomechanisms and the like, and to perform useful work (as in diaphragm pumps) or reaction engines. One of the few disadvantages of a fluidics circuit appears to be its size (by comparison with electronic devices) although this disadvantage is frequently outweighed by the greater thermal stability, reduced tendency toward transient disorders and nonresponsiveness to electronic "noise" or "background." Frequently, it is desired to translate a fluidics output, i.e. an indication of the flow through one or both of the branches, the differential flow rate or the absolute output into electrical signals for measurement, indicating or control purposes or to regulate the fluidics device by an electrical input.

Prior arrangements for accomplishing this latter function have made use of values or the like for regulating the main-input flow or the control-jet inputs, while devices for responding to the flow rates have used rotary or other flowmeters in the fluidics circuit. These arrangements have obvious disadvantages primarily arising from the electrical-mechanical-hydraulic or hydraulic-mechanical-electrical train of control.

It is, therefore, the principal object of the present invention to provide an improved method of operating a fluidics system whereby the aforedescribed disadvantages can be avoided.

A further object of my invention is to provide a fluidics system, in conjunction with electric circuitry, whereby the transition between electrical and hydraulic signals and responses is made more efficiently and economically than has been possible heretofore.

According to an important feature of the present invention, a fluidics Y provided with control jets in the usual manner is supplied with a liquid medium rendered electromagnetically susceptible by, for example, entraining therein magnetically permeable particles (e.g. permanently magnetic or ferromagnetic) and cooperates with electromagnetic means to respond to a control signal or produce a control signal.

Thus, in accordance with one aspect of this invention, at least one and preferably both outlet branches of a fluidics Y may be provided with means responsive to the movement of the fluid through the respective branches to generate a control signal for electronic circuitry (e.g. a feedback network), a measurement signal for indicating a parameter related to the hydraulic flow or for signaling a particular condition. The term "electromagnetic means," as used herein, is intended to refer to magneto-electric systems in which the flow of liquid-entrained particles affects a magnetic core to induce magnetic fields and respective electric currents and/or changes in magnetic fields or electric current; it also refres to systems where the liquid is electrically conductive or dielectric so as to respond to electric fields directly. Alternately, the reaction of the magnetic flow to an electric field may also be detected by suitable magnetometer devices or the like to indicate such flow.

In accordance with another aspect of this invention, it has surprisingly been found that, while the Coanda effect may be overcome by the provision of a nullification or cancellation chamber at the junction of the branches, it can also be countered by electromagnetically rendering the liquid conductive and applying the electromagnetic fields thereto, by applying electrostatic fields to a dielectric liquid, or by incorporating the magnetic or magnetically permeable particles in the liquid stream and then subjecting this stream to magnetic fields in the region of the Coanda junction. Thus, when a magnetic field is applied perpendicularly to the plane of the Y and an electrical field is passed therethrough (perpendicular to plane of the magnetic field), the interaction of the electric field with the moving magnetic field will deflect, in accordance with the polarity of the electric field, the conductive fluid from one branch of the Y to the other and perform a function similar to that of the control jets. Consequently, an electric input can be used to yield a reapportioning of the liquid flows in the branches in proportion to the field strength. When one input of a control circuit using a fluidics Y is a control jet and the other input is an electric field oriented in the manner here described, the resultant deflection or reapportioning of the liquid stream will be the product of both inputs. Similarly, integration of the inputs, arithmetic manipulation, balancing, biasing and feedback control can be achieved precisely and without difficulty.

According to a further feature of this invention, the magnetic liquid is deflected from one branch to the other and the Coanda effect overcome by magnetizable armatures disposed in the region of the junction at locations corresponding to those of the control jets. In this case, the electromagnetic armatures are surrounded by a coil which, when energized, applies a field transverse to the liquid flow across the stream in the plane of the Y and additively, subtractively or otherwise, cooperates with the control jets.

In still another modification of this aspect of the invention, the electromagnetic field is electrostatically and/or electrolytically produced. When electroconductive action is desired, best results are obtained when the liquid is an electrolyte and an electric ion current is passed therethrough to allow the stream to be affected by a magnetic field; more frequently, however, the liquid will be a dielectric medium (e.g. transformer oil, kerosene, or the like) in which magnetic particles are distributed. In my copending application Ser. No. 598,512 filed Dec. 1, 1966 and entitled "Magnetic Filter and Method of Operating Same," I describe a system for use in the removal of particles of detritus from an electrical machining operation whereby the liquid stream is switched from one path to another. The system of the present invention can be used advantageously to this end inasmuch as the switching may be carried out without any mechanical means so that there is no opportunity for failure of moving parts or deterioration of valve structures. There is, moreover, no need to introduce magnetic particles into such a system, since the particles resulting from the machining of iron are, of course, magnetically permeable.

When the system is to be used to provide an electrical output from a fluidics Y, I prefer to provide similar sensing means at each of the branches and to connect these detectors into a bridge network balanced when equal quantities of fluid pass through the branches at equal flow rates or in null position when all of the fluid passes through the "normal" branch. Thus, any unbalancing or reversal of the fluid flow would be represented by a potential difference across the bridge. The degree of imbalance and the polarity of imbalance provides a highly sensitive indication of which branch is carrying the larger proportion of liquid and the relative magnitude of the disproportionate flow. This bridge network is, moreover, substantially independent of transients in the electrical supply and other modifying influences.

When an electrically conductive liquid is to constitute the electromagnetically susceptible fluid, I prefer to use electrolytes such as aqueous solutions of noncorrosive salts (e.g. potassium acetate). Such a fluid is desirable for detection of the flow path or quantity and, to this end, the detector means at the outlet branches may form conductivity cells. For electrostatic control of an electromagnetically susceptible fluid, the latter is constituted by a dielectric liquid (i.e. an electrically insulating or nonconductive liquid. I have discovered that such a liquid can be deflected at the junction of the fluidics Y by disposing electrodes across the stream and charging these electrodes with high-potential electrostatic fields which attract the stream in the plane of the electrodes.

According to still another aspect of this invention, the liquid stream forms a conduit for vibrational energy which can be sensed at one or both outlet branches and thus indicate which of the branches is effective in carrying the stream. To this end, a vibrational-energy transducer may be provided to the inlet side of the splitter junction while a vibrational-energy detector is disposed at one or both of the outlet branches. When the liquid is a translucent organic liquid, it may be capable of sufficient internal reflection to serve as a "light pipe" so that if a light source is provided at the inlet side of the junction, the liquid stream will convey light energy along the selected outlet branch in a bistable fluidics device or proportionally along both outlet branches in a fluid amplifier of the fluidics type. Photoconductive or other photo cell means disposed along these branches can indicate the state of the system (i.e. which outlet branch sustains liquid flow) or the ratio of liquid flow (e.g. via a bridge circuit of the character described). Other forms of vibrational energy are also effective, in accordance with this invention and I may, therefore, provide an electrosonic transducer at the inlet side of the splitter junction and acoustoelectrical transducer means at one or both of the outlet branches, the liquid stream carrying the sonic or ultrasonic vibrations along the branches as previously described.

The above and other objects, features and advantages of the present invention will become more readily apparent from the following description, reference being made to the accompanying drawing in which.

Figure 1:
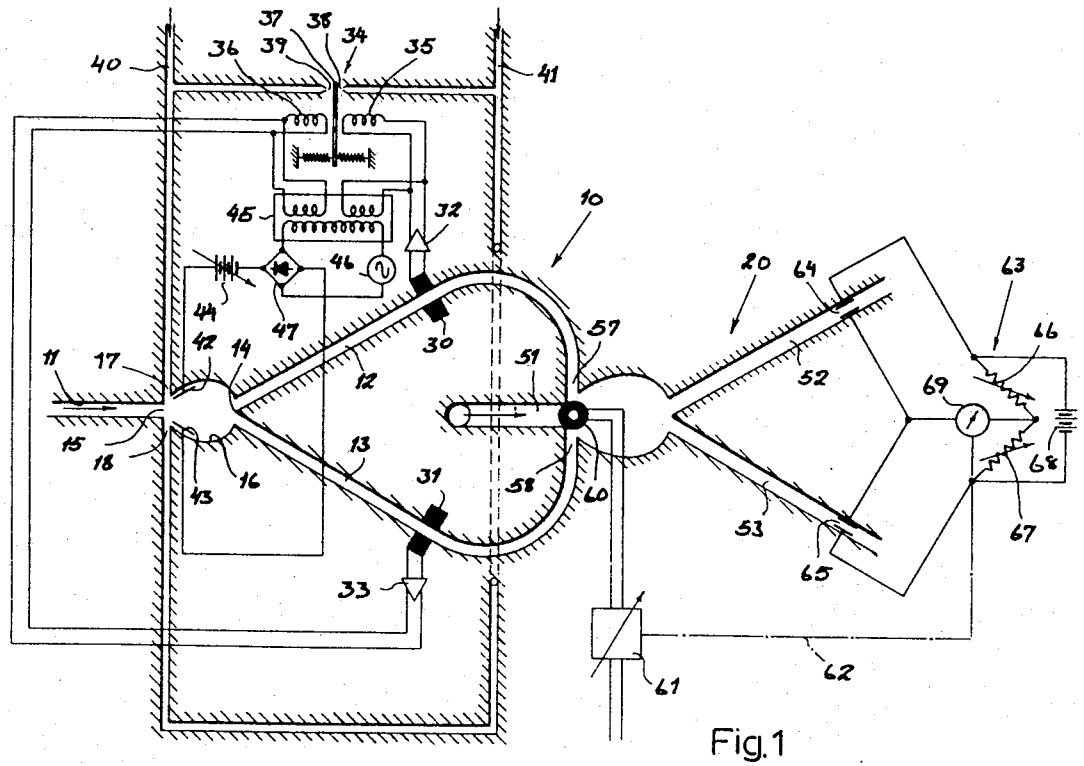
FIG. 1 is a diagrammatic view of a two-stage amplifying apparatus with an electronic feedback, according to the invention.

Referring first to FIG. 1, where certain principles of the invention are illustrated diagrammatically, it can be seen that the basic fluidics circuit element can be a fluid amplifier 10 which is ganged with a second amplifier 20 as will be apparent hereinafter. The amplifier 10 comprises a main or inlet duct 11 into which a jet of a dielectric liquid (e.g. kerosene or mineral oil) is fed by pumping means or the like not otherwise illustrated. While a liquid is particularly referred to here, it will be understood that gaseous fluids are equally suitable for the present purposes if they can be made conductive, e.g. by ionization, or electrically susceptible by other means. At the outlet side of the fluidics Y 10, I provide a pair of outlet arms 12 and 13 to which the stream of liquid is deflected by a knife-edge "splitter" 14 forwardly of the mouth 15 of the main jet. When the wall from the main jet 11 to the outlet arms 12, 13 is continuous, the liquid tends to hug one or the other of these walls by the Coanda effect and the fluidics Y is of the bistable type. When, however, an anti-Coanda chamber 16 (usually of heart shape) is provided adjacent the power jet mouth 15, the stream is prevented from locking onto one or the other wall (until it passes out of the chamber) and indeed is split equally between the outlet channels or branches 12, 13. A pair of control jets 17 and 18 lie in the plane of the outlet branches 12 and 13 and open transversely into the chamber 16 at the mouth 15 of the power jet. When the system is a bistable one, energization of the jets 17 and 18 will trigger reversal of the flow of fluid through the branches 13 or 12, respectively. In the proportioning or amplifying system of FIG. 1, however, energization of the control jets 17 and 18 determines the relative proportions of the power jet which flow through the respective branches. Thus, when control jet 17 is at maximum velocity and control jet 18 is of minimum velocity, the major part of the power stream will pass through outlet channel 13 and vice versa.

According to the principles of this invention, the liquid stream passing through the fluidics Y is rendered electromagnetically susceptible by incorporating therein a multiplicity of permanently magnetic or ferromagnetic particles. As magnetic liquid passes through the outlet branches 12 or 13, it traverses one or both of a pair of magnetic pickup coils 30 and 31 which respond to the flow rate of the magnetic stream through these coils. The coils 30 and 31 are connected via respective amplifiers 32, 33 to the opposite sides of a reed-type fluid-control valve 34 whose electromagnetic coils 35 and 36 are energized through the electronic amplifiers 32 and 33 respectively. Coils 35 and 36 act upon the magnetically permeable reed-type armature 37 adapted alternately to block nozzles 38 or 39 of the valve 34. The nozzles 38 and 39 are adapted to bleed fluid from the respective control jets 17 and 18 which are supplied by ducts 40 and 41, respectively. Thus, the pickups 30 and 31 constitute a feedback control for the fluid streams, whereby the control jets respond to the flow of fluid through the outlet branches via electronic means and without moving parts at the pickup system.

Figure 5:
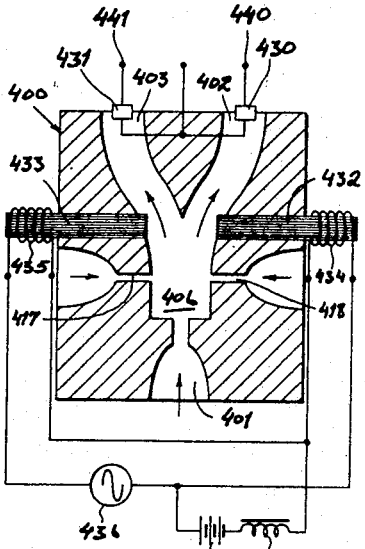
FIG. 5 is a cross-sectional view through a fluidics-circuit element using vibrational energy.
Figure 6:
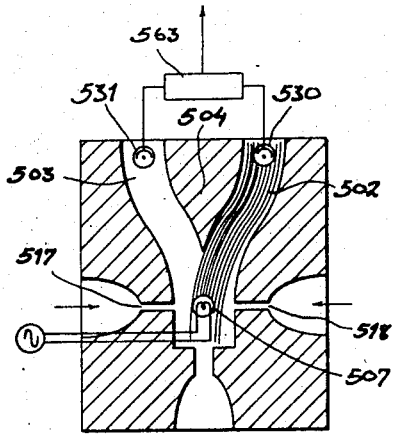
FIG. 6 is a view similar to FIG. 5 wherein the vibrational energy is light energy.
Figure 8:
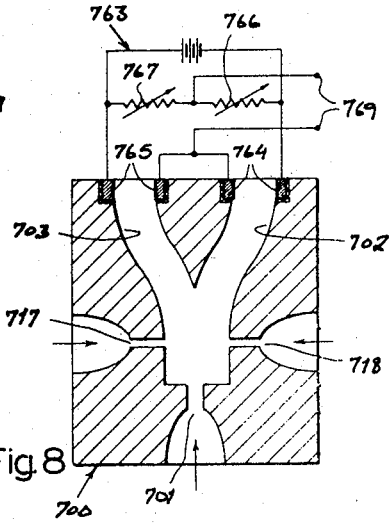
FIG. 8 is a view similar to FIG. 7 wherein, however, the operating liquid is an electrolyte.

In addition or alternatively, feedback may be effected by a pair of electrostatic plates 42 and 43 lying in the plane of the outlet channel 12 and 13 and normally receiving a predetermined high-voltage bias via a battery or another electrostatic source 44. It will be understood that a stream of a relatively nonconductive fluid can be deflected by electrostatic fields when this stream passes between the plates. This principle is here used as a feedback control of the liquid stream via the magnetic pickups 30 and 31. The amplifier 32 and 33 of this system also energizes the control windings of a saturable reactor 45 in series with an A.C. source 46 and a full-wave rectifier 47 which is connected in circuit with the electrostatic electrodes 42 and 43 to modify the static D.C. bias thereagainst. It will be understood that the deflection of the stream here can also be accomplished by conductive means (see FIG. 3) or by the use of magnetic fields (FIG. 2) and that the pickup at the outlet branches 12 and 13 may be accomplished by electrostatic or capacitive techniques (FIG. 9) or resistive systems (FIG. 8). Furthermore, vibrational-energy pickup may be used (FIGS. 5 and 6).

In the two-stage amplifier of FIG. 1, the outlet channels 12 and 13 form the control jets 57 and 58 of the second amplifier 20 whose higher-velocity power jet is introduced at 51. The outlet branches 52 and 53 of this augmented amplifier element may be used to operate a diaphragm pump or control the thrust of a rocket as described, for example, in Fluid-Control Devices, Stanley W. Angrist, "Scientific American," December 1964, pages 81 ff. The liquid can be a rocket-engine fuel (e.g. kerosene) or the liquid oxidizer where desired. The amplifier 20 of FIG. 1 is provided with a magnetic deflecting coil 60 energizable from a remote station or by an operator via a control amplifier 61 or by feedback, as represented by dot-dash line 62. The system also may be used for recording or indicating its state via a bridge network 63, here shown to be of the resistive or Wheatstone type. Two arms of this bridge are formed by conductivity cells 64 and 65 in the outlet branches 52 and 53 while the other resistive arms are formed by fixed or variable resistors 66 and 67. A D.C. source 68 is connected across one bridge diagonal while the other bridge diagonal is provided with an indicating means 69 responsive to imbalance of the bridge. This indicating means can be coupled with the amplifier 61 for positive or negative feedback control of the proportions of the fluid deflected into each outlet channel 52 or 53 or to a telemetry transmitter, if desired. The bridge imbalance is, of course, directly related to the fluid flow proportions in the channels.

Figure 2:
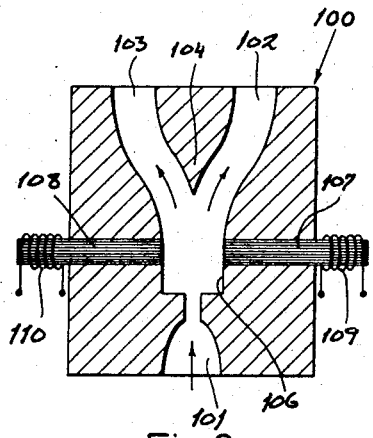
FIG. 2 is a cross-sectional view through the fluidics Y of a control device using magnetic fields.

In FIG. 2, I show an amplifying fluidics Y 100 having a main jet 101 for a liquid-containing magnetic particle. A splitter 104 forwardly of the main jet 101 defines a pair of outlet channels 102, 103, at which amplified fluid signals can be derived. In this embodiment, magnetic means are employed to the inclusion of a control jet for regulating the fluid flow, these means including magnetically permeable (e.g. ferromagnetic) cores 107, 108 in the plane of the branches 102, 103 and on opposite sides of the anti-Coanda chamber 106. Coils 109 and 110, surrounding the cores 107 and 108 are energizable to apply a magnetic flux across the flow path to deflect the fluid stream to one side or the other in proportions determined by the field strength. When a reversing magnetic field of a predetermined level is applied, the device 100 can be used for switching; in the absence of any magnetic flux, the liquid tends to flow uniformly through the fluidics Y and thence through outlet channels 102, 103. If the coils 109 or 110 are energized to apply a magnetic field poled to deflect the magnetic stream to the right, maximum flow is sustained through the outlet channel 102 until the field is reversed. It is, of course, possible to use the magnetic means in conjunction with one or more control jets for applying a predetermined bias. Thus, a control jet may be disposed on one side so as to provide a normal bias in one direction while a magnetic means of an attractive character is disposed on the other side for counteracting the control-jet bias with adjustable field strength. This arrangement is, therefore, useful for amplification of digital signals as well as an input. The outlet branches 102 and 103, of course, may be provided with detectors as illustrated in and described with reference to FIGS. 1 and 5–9, and it is to be understood that such detectors and output means have not been illustrated here merely to clarify the various elements of the fluidics circuitry which can be combined in practice.

EXAMPLE I

Using the system of FIG. 1, with a kerosene liquid containing barium-ferrite particles of 0.05 to 0.1 micron average diameter and specific gravity 0.42, incorporated therein in an amount of 25 g./liter of the liquid medium, magnetic control of the fluid stream could be accomplished. The apex angle of the splitter 104 was 60° and the cross-section of the supply and outlet ducts was substantially 0.75×0.8 mm. The magnetic liquid was introduced at a pressure of 0.03 kg./cm.$^2$ (gauge) and the system was adjusted to direct all of the liquid to one branch of the Y. The magnetic means 107, 109 or 108, 110 was constituted by a Permaloy rod of 0.8 mm. diameter and 10 mm. in length surrounded by a coil having an impedance of 500 ohms. The rod was disposed in the wall of the chamber 106 just downstream of the splitter 104. A current of 5 milliamperes applied to the coil was sufficient to effect reversal of the flow channel of the liquid for switching operations.

Figure 3:
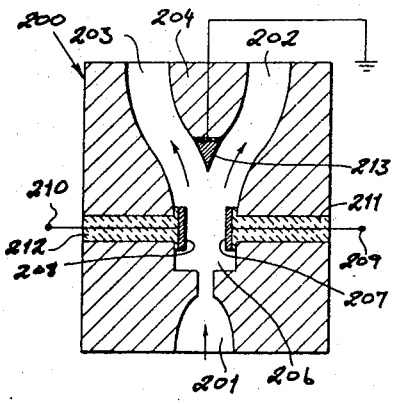
FIG. 3 is a fluid similar to FIG. 2, wherein, however, a dielectric liquid serves as the operating medium.

In FIG. 3, the electromagnetically susceptible fluid transduced through the main or power jet 201 is a dielectric (e.g. kerosene, transformer oil, or an aqueous solution of sugars). The electromagnetic means for controlling the fluid-flow direction is constituted by a pair of electrodes 207 and 208, disposed on opposite sides of the chamber 206 downstream of the splitter 204 and in the plane of the outlet channels 202 and 203. The electrodes 207 and 208 are electrically insulated from the fluidics Y 200 as represented at 211 and 212 while being provided with leads 209 and 210 for connection to an electrostatic generator in parallel. The electrostatic generator is also connected to ground, while a ground terminal 213 is provided for the splitter edge 204 so that electrostatic fields are formed between this intermediate electrode 213 and the individual electrodes 211 and 212 flanking the stream. When high electrostatic voltages are applied between the intermediate electrode and the individual electrodes, a rapid and accurate response of the liquid causes it to flow selectively through the channels 202 and 203.

EXAMPLE II

Using the dimensions of the fluidics Y of Example I but a dielectric control as illustrated in FIG. 3, a pair of electrodes 207 and 208 were juxtaposed with one another at a distance of 30 mm. from the splitter 204. Application of direct-current fields of 5000 volts causes switchover when the splitter electrode 213 is at the ground potential of the electrostatic generator. The liquid vehicle is here transformer oil and the area of the electrodes 207 and 208 was about 0.8 mm.×0.8 mm.

Figure 4:
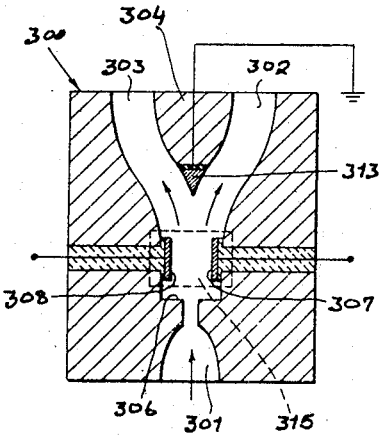
FIG. 4 is another view similar to FIG. 2 of an electromagnetic control system of the fluidics type using a conductive liquid.

FIG. 4 illustrates an electroconductive system in accordance with the invention wherein the liquid vehicle is rendered electromagnetically susceptible by including an ionizable substance therein. An electric current is passed through the liquid as it flows into the fluidics Y 300 from the primary inlet 301 by a pair of electrodes 307 and 308 disposed on opposite sides of the chamber 306 and co-operating with a counter-electrode 313 at the splitter 304. A magnetic field is applied perpendicular to the plane of the paper and the plane of the outlet branches 302 and 303 by a magnetic means represented diagrammatically at 315. In this system, the magnetic field is continuously applied and the flow can be controlled by selectively supplying an electrical signal across the electrodes 307, 313 or 308, 313. The interaction of the electric current flow by ion mobility in the electrolyte and the magnetic field produces the force required for the deflection. Conversely, the electric current may be continuously supplied and the magnetic field pulsed to effect switchover.

EXAMPLE III

Using generally the conditions of Examples I and II but with the fluid replaced by an aqueous 15% by weight potassium acetate solution, an 8000 gauss magnetic field is applied at 315 perpendicularly to the plane of fluid flow. The electrodes are located as described in Example II and the application of a control signal current of 0.1 amp suffices to switch the outlet branch through which the fluid flows.

FIG. 5 illustrates a modified system in accordance with the present invention wherein a signal indicative of the branch selected by the fluid is indicated by a transducing arrangement responsive to vibrational energy. In this embodiment, the fluidics amplifier 400 has it primary input at 401 and a pair of control jets 417 and 418 operating in the unual manner to deflect the fluid stream through the chamber 406 of the Y. The outlet branches 402 and 403 are here provided with electroacoustical transducers 430 and 431 of the piezoelectric or magnetodynamic or variable-reluctance type adapted to respond to sonic or ultrasonic vibrational energy transmitted thereto. A pair of electroacoustical transmitters is provided in the form of magnetostrictive rods 432 and 433 which are activated by coils 434 and 435, respectively, connected in series with an A.C. source or oscillator 436. A battery 437 and a suppressor inductance 438 are connected across these coils in the usual magnetostrictive network. Inasmuch as sonic and ultrasonic vibrations are carried more efficiently by liquid streams, the output 440, 441 of the respective detector 430 and 431 will register an increased signal when the liquid flow, as controlled by the jets 417 and 418 passes through the respective outlet branch. In this system as well, the control means may be of an electromagnetic character, e.g. as illustrated in FIGS. 1–4.

FIG. 6 shows a modified system wherein, at the inlet side of the splitter 504, there is provided a light source 507 to which the light detectors 530 and 531 in the outlet branches 502 and 503 are sensitive. The direction of liquid flow can be controlled by the jet 517 and 518 or the electromagnetic means of FIGS. 1–4. The outputs of the photocells 530 and 531 are connected in a bridge circuit represented at 563 and may be used for control or proportioning indication. In this system, a translucent liquid 550, e.g. a glycol, serves as a light pipe, akin to fiber optics, transmitting light predominantly to the photocell 530. Conversely, but not as effectively, an opaque or light-obscuring liquid can be used when the optical transmitter 507 and the signal receivers 530 and 531 are aligned with one another for direct reception of the light rays. In this arrangement, an obscuring liquid blocks the light rays along the branch of one photocell while the other photocell receives the light rays. Detectors of the type illustrated in FIGS. 5 and 6 can, of course, be used in any of the systems of FIGS. 1–4 to indicate which outlet branch carries the liquid stream.

Figure 7:
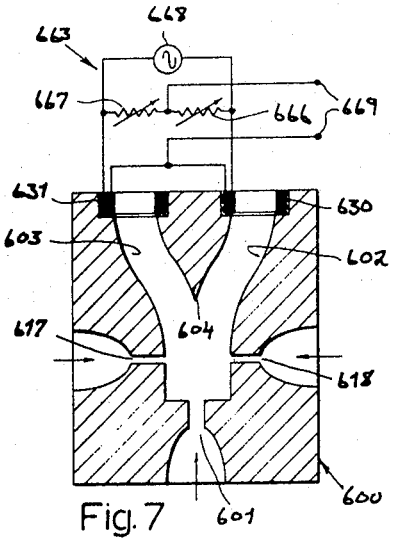
FIG. 7 is a cross-sectional view through the plane of a fluidics Y diagrammatically illustrating a magnetic pickup arrangement according to this invention.
Figure 9:
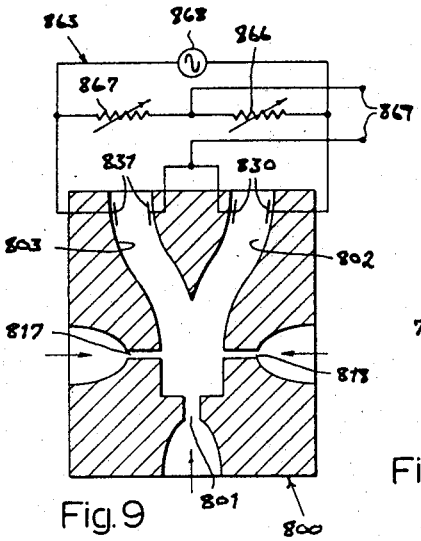
FIG. 9 is still another diagrammatic view of a fluidics circuit element with electromagnetic pickup means, here constituted as a capacitance-sensing element.

In FIGS. 7–9, I show other pickup arrangements which may be used in conjunction with the systems of FIGS. 1–4 individually or in combination. In FIG. 7, for example, the amplifier 600 is provided with the main inlet jet 601 and a pair of control jets 617, 618 as well as a pair of outlet branches 602 and 603. In this case, the liquid contains magnetic particles (see Example I) and the outlet branch 602, 603, separated by the splitter 604, are provided with magnetic pickup coils 630 and 631, respectively. The control jet 617 represents a continuously applied bias jet, deflecting the fluid flow through the outlet branch 602 while the jet 618 is a control jet energizable continuously, variably or in pulsed relationship to counteract the bias jet. The pickup coils 630 and 631 are connected in a bridge network 663 in which they occupy respective branches of the bridge while the other arms of the bridge are constituted by variable resistors 666 and 667. An alternating-current source 668 is connected across one diagonal of the bridge and an output is retrieved at terminals 669. With the bias jet 617 energized and the control jet 618 off, the variable resistors 666 and 667 may be adjusted so that no output is received at 669. When the control pulse is applied at input 618, however, the inductance of coil 630 decreases while that of coil 631 increases to create a potential across terminal 669. This output can be delivered to a recorder or employed in any other way as described with respect to FIG. 1.

The fluidics amplifier 700 of FIG. 8 comprises, at the outlet branches 702 and 703, pairs of electrodes 764 and 765 serving as detectors and connected in a bridge circuit 763 similar to that illustrated at 63 in FIG. 1. The output terminals 769 of this bridge circuit deliver a voltage signal proportional to the imbalance of the bridge and, therefore, to changes in flow of a conductive fluid through the conductivity detectors 764, 765. The liquid introduced at the main jet 701, the bias jet 717 and the control 718 may be an aqueous electrolyte (Example III). The resistors 766 and 767 can, of course, be adjusted to deliver zero output (null) at terminal 769 when the liquid flow is through one branch (e.g. outlet 702) so that the imbalance represented by the output at terminal 769 is directly related to the effect of control jet 718.

In the modification of FIG. 9, the amplifier 800 receives at its inlet jet 801, bias jet 817 and control jet 818, a dielectric liquid (Example II) which passes, as previously described, into one or both of the outlets 802 and 803. The detector means 830 and 831 is here constituted by pairs of plates in a capacitance bridge 863 by the A.C.-source 86 and having variable resistors 866 and 867 adjustable for any desired null-condition. The output is drafted at 869. The capacitance sensed by the detectors 830 and 831 is a function of the dielectric constant of the fluid between the electrodes and, consequently, to the presence or absence of a liquid whose dielectric constant is materially different from that of air. The device thus responds to the dielectric constants to indicate the presence or absence of a fluid stream in the respective branch.

The fluidics Y in all of the preceding embodiments can, of course, omit the chamber 16, 116, 216 etc., and have the configuration of a bistable device (cf. Scientific American, supra) in accordance with this invention. The electrical control means then serves to switch the stable states while the detectors may indicate, at a remote station, the particular state or condition.

I claim:

1. A fluidics amplifier or bistable device comprising:

a unit having an inlet side provided with at least one inlet branch, an outlet side having a pair of outlet branches opening toward said inlet branch and diverging from a common junction proximal to said inlet branch, and a flow splitter at the junction of said outlet branches, said device being traversable from said inlet side to said outlet side by an electromagnetically susceptible fluid;

electromagnetic means at least at one of said sides co-operating with said fluid for applying an electromagnetic field thereto of a strength sufficient to deflect said stream at least partly into one of said outlet branches or to sense the flow of said fluid through at least one of said outlet branches, said fluid being a liquid entraining magnetically permeable particles, and said electromagnetic means including a pair of coils disposed respectively at said outlet branches for generating respective electrical signals upon the inducing of an electric field in each coil with passage of said liquid through said outlet branches;

means for applying a magnetic field across a stream of liquid at said inlet side for deflecting said stream selectively between said branches;

at least one controlled jet opening transversely to said liquid stream at said inlet side for applying a bias to said liquid stream and directing it preferentially into one of said outlet branches; and a transmitter of vibrational energy disposed at said inlet side for applying said vibrational energy to said liquid, and at least one receiver responsive to the vibrational energy transmitted by said liquid and activated upon the passage of said liquid in the respective outlet branch.

2. The device defined in claim 1 wherein said particles are permanently magnetic.

3. A method of operating a fluidics device having an inlet side provided with at least one inlet branch and an outlet side having a pair of outlet branches opening toward said inlet branch and separated by a fluid-flow splitter, comprising the steps of:

passing a nonconductive liquid stream through said device from said inlet side to said outlet side;

dispersing particles of an electromagnetically susceptible material in said stream for entrainment thereby, said material being capable of interaction with an electromagnetic field;

electromagnetically sensing the flow of said liquid through said one of said outlet branches;

applying to the liquid stream passing through said fluidics device at said inlet side an electromagnetic field of a strength sufficient to deflect said liquid stream at least partly into one of said outlet branches;

deriving from said electrical output a feedback-control signal; and modifying at least one parameter of the liquid flow at said inlet side by said feedback-control signal.

4. The method defined in claim 3 wherein said liquid stream is rendered electromagnetically susceptible by admixing magnetically permeable particles with said liquid, said flow of liquid being sensed in said one of said outlet branches by inducing an electric-current flow upon the liquid-entrained particles traversing said one of said branches.

5. The method defined in claim 3 wherein said liquid is water and said particles are ions of a water-soluble salt dissolved in said liquid, and wherein the passage of said liquid through said one of said branches is detected by measuring the electrical resistance across a portion of said one of said branches.

6. The method defined in claim 3 wherein an electrical output is derived from each of said outlet branches proportional to a parameter of the liquid flow therethrough, said method further comprising the step of combining said outputs to produce a signal indicative of the relative values of said liquid-flow parameter in said branches.

7. A fluidics amplifier or bistable device having an inlet side provided with at least one inlet branch, an outlet side having a pair of outlet branches opening toward said inlet branch and diverging fro ma common junction proximal to said inlet branch, and a flow splitter at the junction of said outlet branches, said device being traversable from said inlet side to said outlet side by an electromagnetically susceptible fluid; electromagnetic means at least at one of said sides co-operating with said fluid for applying an electromagnetic field thereto of a strength sufficient to deflect said stream at least partly into one of said outlet branches or to sense the flow of said fluid through at least one of said outlet branches, said fluid being an electrically conductive liquid and said electromagnetic means including a conductivity cell in each of said outlet branches responsive to the resistivity of said liquid; and circuit means for producing an electrical feedback control signal responsive to the flow of fluid through at least one of said outlet branches, and modifying at least one parameter of the fluid flow at said inlet side by said feedback control signal.

8. A device as defined in claim 7, further comprising means for passing an electric current through said liquid at least at said inlet side, said electromagnetic means including means for applying a magnetic field perpendicular to the plane of said stream for interaction with the current-conducting fluid.

9. A fluidics amplifier or bistable device having an inlet side provided with at least one inlet branch, an outlet side having a pair of outlet branches opening toward said inlet branch and diverging from a common junction proximal to said inlet branch and a flow splitter at the junction of said outlet branches, said device being traversable from said inlet side to said outlet side by an electromagnetically susceptible fluid; electromagnetic means at least at one of said sides co-operating with said fluid for applying an electromagnetic field thereto of a strength sufficient to deflect said stream at least partly into one of said outlet branches or to sense the flow of said fluid through at least one of said outlet branches, said fluid being a liquid dielectric and said electromagnetic means including a pair of electrodes in each of said outlet branches responsive to the dielectric constant of the intervening space for producing an output in dependence upon the passage of said liquid through the respective branch; and circuit means for producing an electrical feedback control signal responsive to the flow of fluid through at least one of said outlet branches, and modifying at least one parameter of the fluid flow at said inlet side by said feedback control signal.

[10. A method of operating a fluidics device having an inlet side provided with at least one inlet branch and an outlet side having a pair of outlet branches opening toward said inlet branch and separated by a fluid-flow splitter, comprising the steps of passing a stream of an electromagnetically susceptible liquid through said device from said inlet side to said outlet side; applying to the liquid stream passing through said device at said inlet side an electromagnetic field of a strength sufficient to deflect said stream at least partly into one of said outlet branches; electrically detecting at least one flow parameter of the liquid stream passing through said outlet side; and electrically controlling the electromagnetic field in response to the electrically detected flow parameter.]

[11. The method defined in claim 10 wherein said liquid stream is rendered electromagnetically susceptible by admixing therewith magnetically permeable particles entrainable by said liquid, and wherein said electromagnetic field is a magnetic field applied in the plane of liquid flow and across said liquid stream.]

[12. The method defined in claim 10 wherein said liquid is water and is rendered electromagnetically susceptible dissolving a water-soluble salt therein to form an electrolyte and by passing a current through said electrolyte, a magnetic field being applied perpendicularly to the plane of said liquid stream.]

13. In a fluidics device having an inlet side provided with at least one inlet branch, an outlet side having a pair of outlet branches opening toward said inlet branch and diverging from a common junction proximal to said inlet branch, a flow splitter at the junction of said outlet branches, and means for shifting the flow of liquid from said inlet branch between said outlet branches, the improvement which comprises a generator of liquid-transmissible energy exposed to the liquid traversing said inlet branch, and a detector of liquid-transmissible energy exposed to the liquid traversing at least one of said outlet branches for energization by energy transmitted in the liquid stream upon its switching to said one outlet branch.

14. The improvement defined in claim 13 wherein said transmitter is a light source, said liquid is translucent and said detector is a photoelectric device.

15. The improvement defined in claim 13 wherein said transmitter is a source of vibrations in contact with the liquid traversing said inlet branch and the detector is a vibration-responsive transducer.

*16. A method of operating a fluidics device having an inlet side provided with at least one inlet branch and an outlet side having a pair of outlet branches opening toward said inlet branch and separated by a fluid-flow splitter, comprising the steps of passing a stream of an electromagnetically susceptible liquid through said device from said inlet side to said outlet side; applying to the liquid stream passing through said device at said inlet side an electromagnetic field of a strength sufficient to deflect said stream at least partly into one of said outlet branches; electrically detecting at least one flow parameter of the liquid stream passing through said outlet side; and electrically controlling the electromagnetic field in response to the electrically detected flow parameter wherein said liquid stream is rendered electromagnetically susceptible by admixing therewith magnetically permeable particles entrainable by said liquid, and wherein said electromagnetic field is a magnetic field applied in the plane of liquid flow and across said liquid stream.*

*17. A method of operating a fluidics device having an inlet side provided with at least one inlet branch and an outlet side having a pair of outlet branches opening toward said inlet branch and separated by a fluid-flow splitter, comprising the steps of passing a stream of an electromagnetically susceptible liquid through said device from said inlet side to said outlet side; applying to the liquid stream passing through said device at said inlet side an electromagnetic field of a strength sufficient to deflect said stream at least partly into one of said outlet branches; electrically detecting at least one flow parameter of the liquid stream passing through said outlet side; and electrically controlling the electromagnetic field in response to the electrically detected flow parameter wherein said liquid is water and is rendered electromagnetically susceptible dissolving a water-soluble salt therein to form an electrolyte and by passing a current through said electrolyte, a magnetic field being applied perpendicularly to the plane of said liquid stream.*

* * * * *